United States Patent
Choi et al.

(10) Patent No.: US 10,194,335 B2
(45) Date of Patent: Jan. 29, 2019

(54) WIRELESS COMMUNICATION METHOD USING HYBRID BEAMFORMING AND APPARATUS THEREFORE

(71) Applicant: SK Telecom Co., Ltd., Seoul (KR)

(72) Inventors: Changsoon Choi, Seoul (KR); Haesung Park, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 15/872,898

(22) Filed: Jan. 16, 2018

(65) Prior Publication Data

US 2018/0139628 A1     May 17, 2018

Related U.S. Application Data

(63) Continuation of application No. PCT/KR2016/001420, filed on Feb. 12, 2016.

(30) Foreign Application Priority Data

Jul. 16, 2015    (KR) ........................ 10-2015-0101157

(51) Int. Cl.
| | |
|---|---|
| *H04W 24/10* | (2009.01) |
| *H04W 16/28* | (2009.01) |
| *H04W 16/32* | (2009.01) |
| *H04B 7/06* | (2006.01) |
| *H04L 25/02* | (2006.01) |

(52) U.S. Cl.
CPC .......... *H04W 16/28* (2013.01); *H04B 7/0617* (2013.01); *H04L 25/0204* (2013.01); *H04W 16/32* (2013.01); *H04W 24/10* (2013.01)

(58) Field of Classification Search
CPC ............................ H04W 16/28; H04B 7/0617
See application file for complete search history.

(56) References Cited

U.S. PATENT DOCUMENTS

| | | | |
|---|---|---|---|
| 8,630,267 B1 | 1/2014 | Jin | |
| 2012/0155341 A1 | 6/2012 | Yamamoto et al. | |
| 2013/0115985 A1* | 5/2013 | Davydov | ............... H04B 7/024 455/501 |
| 2014/0204846 A1 | 7/2014 | Maltsev et al. | |

FOREIGN PATENT DOCUMENTS

EP     2887562 A1    6/2015

OTHER PUBLICATIONS

International Search Report for PCT/KR2016/001420 dated Jun. 8, 2016, citing the above reference(s).

* cited by examiner

*Primary Examiner* — Tuan H Nguyen
(74) *Attorney, Agent, or Firm* — Hauptman Ham, LLP

(57) ABSTRACT

The disclosure relates to a wireless communication technology, and more specifically, to a method and an apparatus for connecting a wireless backhaul by generating reception status information, and interference information or location information, on the basis of a beamforming signal at the time of configuration of a wireless backhaul between base stations through beamforming.

9 Claims, 6 Drawing Sheets

WIRELESS COMMUNICATION METHOD USING HYBRID BEAMFORMING AND APPARATUS THEREFORE

CROSS-REFERENCE TO RELATED APPLICATIONS

The present application is a continuation of International Patent Application No. PCT/KR2016/001420, filed on Feb. 12, 2016, which is based upon and claims the benefit of priority to Korean Patent Application No. 10-2015-0101157, filed on Jul. 16, 2015. The disclosures of the above-listed applications are hereby incorporated by reference herein in their entirety.

TECHNICAL FIELD

The disclosure relates to a method and apparatus for reducing interference with a terminal caused by sidelobes in a hybrid beamforming structure.

BACKGROUND

The discussion in this section is only to provide background information of the present embodiment and does not constitute an admission of prior art.

Unlike the past when radio communication provided a service centered on voice traffic, the number of backhaul links for transmitting hundreds of megabytes per second (Mbps) or more are gradually increasing with the rapid development of third generation/fourth generation (3G/4G) mobile communication for providing a multimedia service. Also, with the advent of next-generation mobile communication such as 5G mobile communication, a necessity of wireless transmission of gigabytes per second (Gbps) or more is increasing such that frequencies of a millimeter wave band which facilitate ensuring a bandwidth of hundreds of MHz or higher are attracting attention. Further, 3G partnership project (3GPP) began a discussion about standardization. In this way, considerable discussions about 5G element technology development and 5G standard technology are taking place among companies and organizations. Here, millimeter waves denote electromagnetic waves having a frequency of 30 GHz or higher (30 to 300 GHz). Currently, 28 GHz, 38 GHz, 60 GHz, 70 GHz, and the like are taken into consideration as frequencies to be used in 5G mobile communication networks.

Such a millimeter wave band shows a larger transmission loss and a lower diffractive feature than an existing 4G frequency band, and thus a beamforming technology for concentrating radio waves toward a desired direction using a plurality of antennas is generally used in wireless transmission.

Meanwhile, 5G mobile communication employing such millimeter waves requires a large number of small cells to cover many shadow areas caused by a high transmission rate and a low diffractive feature. Therefore, in consideration of capital expenditure (CAPEX) and operating expenses (OPEX), a necessity of low-priced small cells increases.

However, when a wired transmission network is used to backhaul data from a small cell to a macro cell, a large amount of cost is required to build the wired network separately from the low-priced small cell.

As a solution to this problem, a self-backhauling technology for separating, while using the same frequency/time resources, a wireless backhaul between a macro-cell base station (BS) and a small-cell BS and a wireless link between a BS and a terminal according to a beamforming technique is attracting attention.

In a general wireless backhaul, a backhauling frequency band between BSs and a frequency band used for a terminal are different to prevent interference. In this case, since it is necessary to assign predetermined frequency resources for backhauling, a frequency capacity of a small-cell BS is reduced. On the other hand, the millimeter wave band enables backhauling in which the same frequency/time resources are used due to high directivity based on beamforming.

However, even when a beamforming-based wireless backhaul is implemented between a macro-cell BS and a small-cell BS, there is a problem of interference between each cell and a terminal.

Since a macro-cell BS transmits and receives radio waves in a relatively larger range than a small-cell BS, there is no significant difference in distance and angle between a small-cell BS and terminals connected to the small-cell BS from the viewpoint of the macro-cell BS, and thus interference occurs even when radio waves are transmitted and received based on beamforming. This problem worsens in a downlink in which the macro-cell BS emits a wireless backhauling wave with high transmission power.

In other words, during beamforming-based wireless backhauling, there is an interference factor for a terminal that receives a downlink signal from a small-cell BS.

SUMMARY

The disclosure is directed to providing a method and apparatus for connecting a wireless backhaul by generating reception status information and interference information or location information on the basis of a beamforming signal, which can minimize interference with a terminal receiving a downlink signal from a small-cell base station (BS), during a beamforming process for a wireless backhaul between a macro-cell BS and the small-cell BS.

Objects of the disclosure are not limited to those mentioned above, and unmentioned other objects will be apparently understood by those of ordinary skill in the art to which the disclosure pertains from the description below.

One aspect of the disclosure provides a method of connecting a wireless backhaul, the method including: receiving, by a small-cell base station (BS), a plurality of beamforming signals from a macro-cell BS to connect a wireless backhaul; collecting information on the plurality of beamforming signals' interference with a terminal connected to the small-cell BS or location information of the terminal; and connecting, by the small-cell BS, a wireless backhaul to the macro-cell BS based on reception status information of the received plurality of beamforming signals and the interference information or the location information.

Another aspect of the disclosure provides a method of connecting a wireless backhaul, the method including: transmitting, by a macro-cell BS, a plurality of beamforming signals to a small-cell BS to connect a wireless backhaul; receiving, by the macro-cell BS, reception status information of the plurality of beamforming signals and information on the plurality of beamforming signals' interference with a terminal connected to the small-cell BS or location information of the terminal from the small-cell BS; and selecting one of the plurality of beamforming signals based on the reception status information of the plurality of beamforming signals and the interference information or the location information, and connecting a wireless backhaul to the small-cell BS.

Another aspect of the disclosure provides an apparatus for connecting a wireless backhaul, the apparatus including: a wireless transceiver configured to transmit and receive wireless signals; and a control unit configured to control the wireless transceiver, wherein the control unit includes a beamforming search module configured to control the wireless transceiver to exchange a plurality of beamforming signals having different directivities between a macro-cell BS and a small-cell BS, and to check information on reception status of the plurality of beamforming signals at the small-cell BS; a collection module configured to collect information on the plurality of beamforming signals' interference with a terminal connected to the small-cell BS or location information of the terminal; and a backhaul connecting module configured to select one of the plurality of beamforming signals based on the reception status information of the plurality of beamforming signals and the interference information or the location information, and connect a wireless backhaul between the macro-cell BS and the small-cell BS.

According to the disclosure, when a backhaul is connected using a wireless network, information on interference with a terminal caused by the wireless backhaul is checked, and beamforming is performed in consideration of the interference information. In this way, it is possible to reduce radio wave interference with a terminal connected to a small-cell base station (BS) caused by the wireless backhaul from a macro-cell BS.

In particular, according to the disclosure, even when the same frequency/time resources are used in radio communication between a terminal and a BS to implement a wireless backhaul, radio wave interference with the terminal is minimized such that a stable service can be provided.

Effects of the disclosure are not limited to those mentioned above, and other effects of the disclosure will be apparently understood by those of ordinary skill in the art to which the disclosure pertains from the description below.

BRIEF DESCRIPTION OF DRAWINGS

The accompanying drawings which are included as a portion of the detailed description to help understanding of the disclosure provide embodiments of the disclosure and illustrate technical features of the disclosure along with the detailed description.

DETAILED DESCRIPTION

Figure 1:
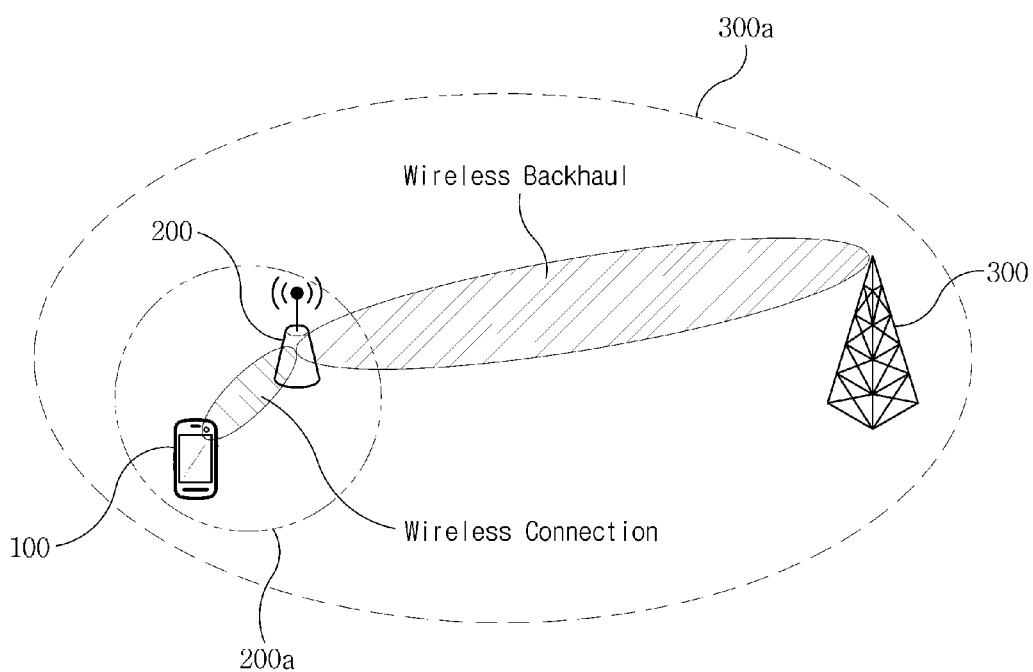
FIG. 1 is a diagram schematically showing a radio communication system in which a wireless backhaul according to the disclosure is implemented.

Hereinafter, exemplary embodiments of the disclosure will be described in detail with reference to the accompanying drawings. The detailed description set forth below in connection with the accompanying drawings is intended as a description of exemplary embodiments of the disclosure and is not intended to represent the only embodiment in which the disclosure can be implemented. The detailed description includes specific details for providing a thorough understanding. However, it will be apparent to those of ordinary skill in the art that the disclosure can be implemented without these specific details.

In some cases, well-known structures and devices may be omitted or shown in the form of a block diagram related to a core function of each structure and device to avoid obscuring the concept of the disclosure.

Throughout the specification, when a part is referred to as "comprising" or "including" a component, this indicates that the part may further include another component instead of excluding another component unless particularly stated otherwise. The terms such as "unit," "-er (or)," and "module" used in the specification refer to a unit that performs at least one function or operation, and may be implemented in hardware, software or a combination of hardware and software. Also, "a" or "an," "one," "the," and the like may be used to include both the singular form and the plural form unless indicated otherwise in the context of the disclosure (particularly in the context of the claims) or clearly denied in the context.

In addition, terminology including ordinal numbers such as first and second may be used to describe a variety of components. The terminology is only used to distinguish one component from other components and is not used to limit the components. For example, a second component may be referred to as a first component without departing from the scope of the disclosure, and similarly, the first component may also be referred to as the second component.

Specific terms used in the following description are provided only to help understanding of the disclosure, and the use of the specific terms may be modified in a different form without departing from the technical spirit of the disclosure. The disclosure relates to the formation of a wireless backhaul for a base station (BS) that processes a wireless connection with a user.

Here, backhauling denotes collecting and transferring data between a BS and a backbone network. In the case of a radio communication system, a backhaul may be generally connected between a BS and a backbone network in a wired or wireless manner Here, a BS may indicate a node B, an evolved node B (eNodeB), an access point (AP), a radio access station (RAS), a base transceiver station (BTS), a mobile multihop relay (MMR)-BS, and the like, and may include functions of all or some of a nodeB, an eNodeB, an AP, an RAS, a BTS, an MMR-BS, and the like.

In particular, in the disclosure, a fifth generation (5G)-based mobile communication system whose small-cell BS is installed in a shadow area or an area in which communication is concentrated within the coverage of a macro-cell BS is taken into consideration. In the disclosure, backhauling includes the formation of a backhaul between the macro-cell BS and the small-cell BS.

For reference, the macro-cell BS denotes a BS that is applied to a general mobile communication system and has high transmission power and wide coverage, and the small-cell BS denotes, as a comparative concept of a macro cell, a BS that has lower transmission power and smaller coverage than the macro-cell BS. Such a small-cell BS is a common designation of, for example, BS equipment with a low output of 10 W or less per antenna, a pico-cell, a femto-cell, a micro-cell, and the like.

For reference, the small-cell BS is disposed in a shadow area, in a boundary area between BSs, indoors, or the like and used for covering the shadow area, traffic distribution in a high traffic area, or transmission in a heterogeneous network such as mobile communication, wireless fidelity (WiFi), and the like.

An apparatus and method for connecting a wireless backhaul according to the disclosure will be described below based on a radio communication environment including a macro-cell BS and a small-cell BS with reference to FIGS. 1 to 8.

FIG. 1 is a diagram schematically showing a radio communication system in which a wireless backhaul according to an embodiment of the disclosure is implemented.

As shown in FIG. 1, a mobile communication system according to an embodiment of the disclosure includes at least one terminal 100, a small-cell BS 200, and a macro-cell BS 300.

The terminal 100 denotes user equipment (UE) that is connected to a radio communication network and transmits and receives data. Here, "terminal" may be replaced by terms such as "UE," "mobile station (MS)," "mobile subscriber station (MSS)," "subscriber station (SS)," "advanced mobile station (AMS)," "wireless terminal (WT)," "machine-type communication (MTC) device," "machine-to-machine (M2M) device," "device-to-device (D2D) device," "station (STA)," and the like. However, a terminal mentioned in the specification is not limited thereto and can be any device that is connected to a radio communication network provided by the disclosure. The small-cell BS 200 and the macro-cell BS 300 provide a wireless link to the terminal 100 in the radio communication system, and a wireless backhaul is connected between the small-cell BS 200 and the macro-cell BS 300.

In particular, the small-cell BS 200 makes a connection with the at least one terminal 100 within the communication coverage thereof and exchanges data with the at least one terminal 100. Here, with regard to the terminal 100, data transmitted to the terminal 100 is referred to as a downlink signal, and data transmitted from the terminal 100 is referred to as an uplink signal.

An uplink signal of the at least one terminal 100 that is received from the at least one terminal 100 by the small-cell BS 200 is transmitted to the macro-cell BS 300 through the wireless backhaul and then transferred to a wired backhaul and a backbone network through the macro-cell BS 300. On the other hand, a downlink signal transferred from the backbone network and the wired backhaul is transferred from the macro-cell BS 300 to the small-cell BS 200 through the wireless backhaul and then transmitted to the at least one terminal 100 through the small-cell BS 200.

Figure 5:
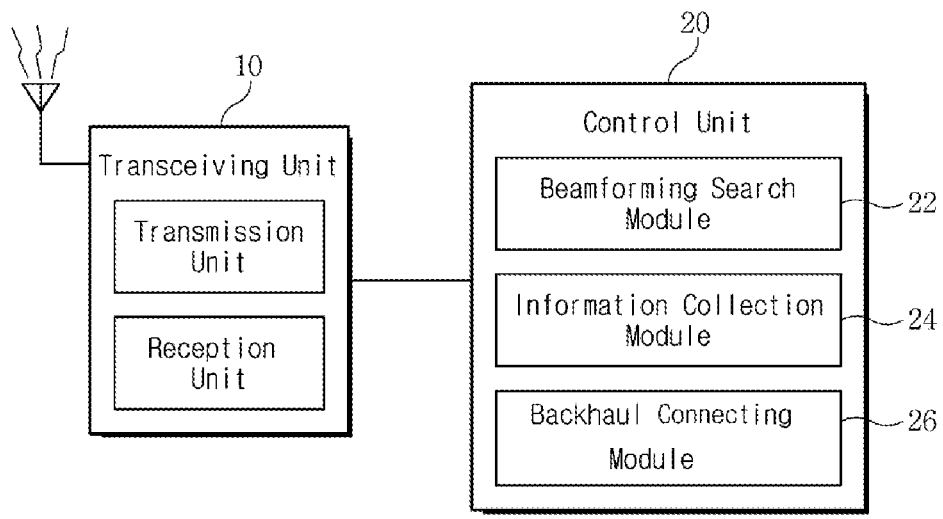
FIG. 5 is a diagram showing a configuration of a wireless backhaul connecting apparatus according to an embodiment of the disclosure.

These small-cell BS 200 and macro-cell BS 300 have wireless backhaul connecting apparatuses shown in FIG. 5 according to the disclosure and may connect a wireless backhaul through the wireless backhaul connecting apparatuses.

For reference, the wireless backhaul may be connected for each of a downlink and an uplink. Since the disclosure is intended to connect a wireless backhaul while minimizing interference with the terminal 100, the following description will be made on the basis of the formation of a wireless backhaul for a downlink in which relatively severe interference with the terminal 100 may occur. However, this is not intended to limit the scope of the disclosure, and the disclosure can also be applied to an uplink as necessary.

The small-cell BS 200 and the macro-cell BS 300 having the wireless backhaul connecting apparatuses according to the disclosure perform a beamforming process to determine a beam direction for connecting a wireless backhaul. In particular, the macro-cell BS 300 performs downlink beamforming for a wireless backhaul for a downlink signal.

Specifically, the macro-cell BS 300 emits a plurality of beamforming signals one by one in different directions and receives feedback information of the plurality of beamforming signals from the small-cell BS 200.

At this time, the small-cell BS 200 receives a plurality of beamforming signals including training symbols from the macro-cell BS 300 and generates reception status information using the received beamforming signals. Also, the small-cell BS 200 may collect interference information of each of the plurality of beamforming signals from the terminal 100 connected thereto. Subsequently, a beamforming signal for a downlink is determined from among the plurality of beamforming signals based on the reception status information and the interference information. According to an embodiment of the disclosure, the small-cell BS 200 may feed the interference information and the reception status information back to the macro-cell BS 300 so that the macro-cell BS 300 may select a beamforming signal and connect a wireless backhaul. According to another embodiment of the disclosure, the small-cell BS 200 may select one of the plurality of beamforming signals based on the interference information and the reception status information and then transmit selection information to the macro-cell BS 300 so that the macro-cell BS 300 may connect a wireless backhaul based on the selection information.

Here, beamforming may be performed using a millimeter wave band.

For reference, millimeter waves have a low penetrability and a very small beam width. Therefore, BSs are connected on a one-to-one basis through precise adjustment of antennas thereof, and it is possible to obtain a high quality when a wireless backhaul is implemented.

Also, the small-cell BS 200 makes a wireless connection with the terminal 100 in the communication coverage thereof and exchanges a downlink signal and an uplink signal with the terminal 100 through connected wireless resources. At this time, the communication coverage of the small-cell BS 200 may be an area 200a indicated by an alternate long and short dash line in FIG. 1. A wireless link between the small-cell BS 200 and the terminal 100 and the wireless backhaul between the macro-cell BS 300 and the small-cell BS 200 may use the same frequency/time resources.

Further, the macro-cell BS 300 may connect the wireless backhaul to the small-cell BS 200, exchange a downlink signal/uplink signal through the wireless backhaul, and simultaneously exchange a downlink signal/uplink signal with an arbitrary terminal (not shown) in the communication coverage thereof by connecting a wireless link to the terminal.

The communication coverage of the macro-cell BS 300 may be an area 300a indicated by a broken line in FIG. 1.

Next, a process of connecting a wireless backhaul in the radio communication system having the above-described structure will be described in detail with reference to FIGS. 2 to 4.

Figure 2:
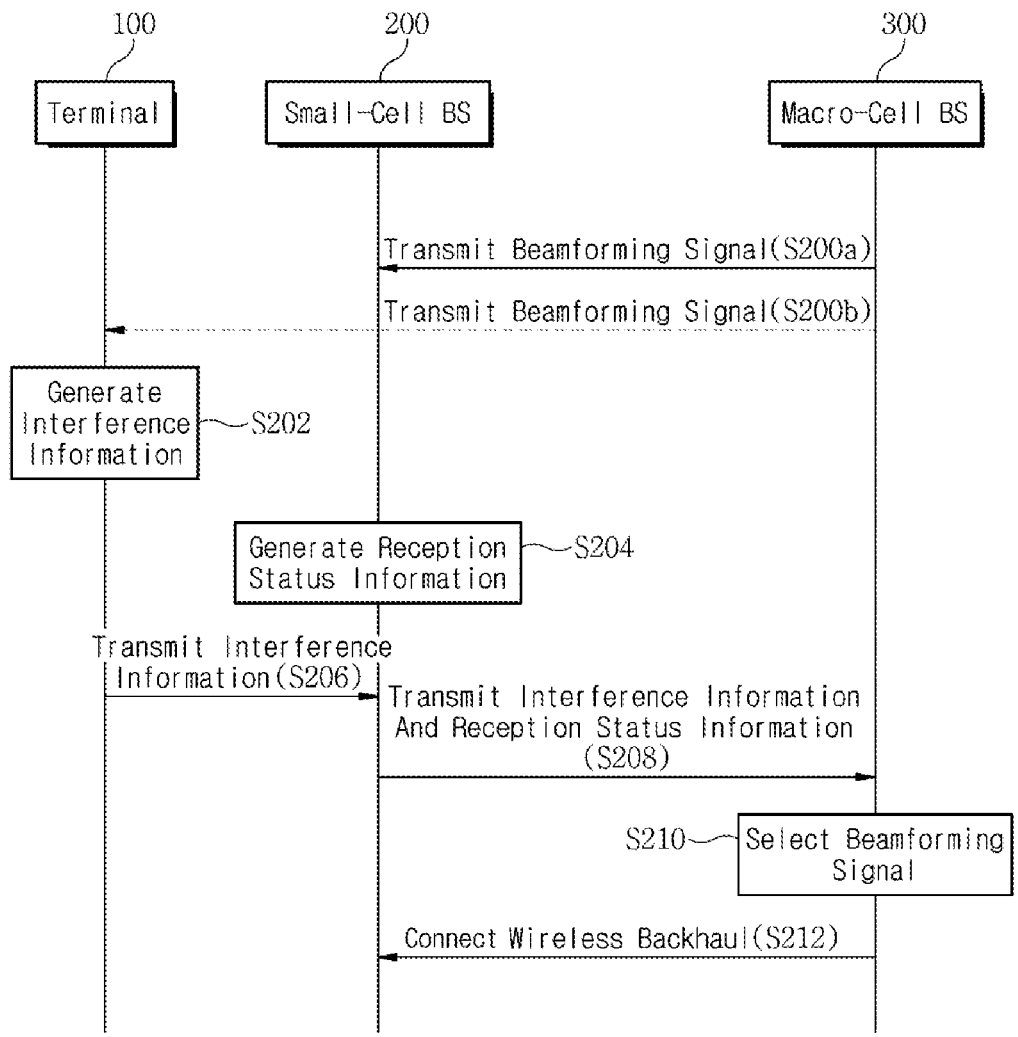
FIGS. 2 to 4 are message sequence diagrams showing processes of connecting a wireless backhaul in a radio communication system according to an embodiment of the disclosure.

FIG. 2 is a message sequence diagram showing a process of connecting a wireless backhaul according to an embodiment of the disclosure.

Referring to FIG. 2, it is possible to see a process in which the macro-cell BS 300 transmits beamforming signals and the terminal 100 and the small-cell BS 200 generate information based on the beamforming signals transmitted by the macro-cell BS 300 such that a wireless backhaul is connected.

The macro-cell BS 300 radially transmits beamforming signals, and the signals may arrive at the small-cell BS 200 and the terminal 100 within the beamforming signal range thereof (S200a and S200b).

The terminal 100 generates interference information based on the beamforming signals arriving from the macro-cell BS 300 (S202) and transmits the generated interference information to the small-cell BS 200 through a wireless link between the terminal 100 and the small-cell BS 200 (S206). Specifically, the terminal 100 may recognize a plurality of beamforming signals on the basis of training signals included in the plurality of beamforming signals and generate the interference information using a signal-to-noise ratio (SNR) and the like. Here, the plurality of beamforming signals act as noise for a downlink signal received by the terminal 100. The plurality of beamforming signals can be transmitted at the same time or one by one.

The small-cell BS 200 generates reception status information based on the beamforming signals arriving from the macro-cell BS 300 (S204). Here, the reception status information may include a received signal intensity. The small-cell BS 200 transmits the interference information received from the terminal 100 and the reception status information generated by itself to the macro-cell BS 300 (S208).

The macro-cell BS 300 selects a beamforming signal for connecting a wireless backhaul based on the received interference information and reception status information (S210). The macro-cell BS 300 connects a wireless backhaul by beamforming with the selected signal toward the small-cell BS 200 (S212).

Figure 3:
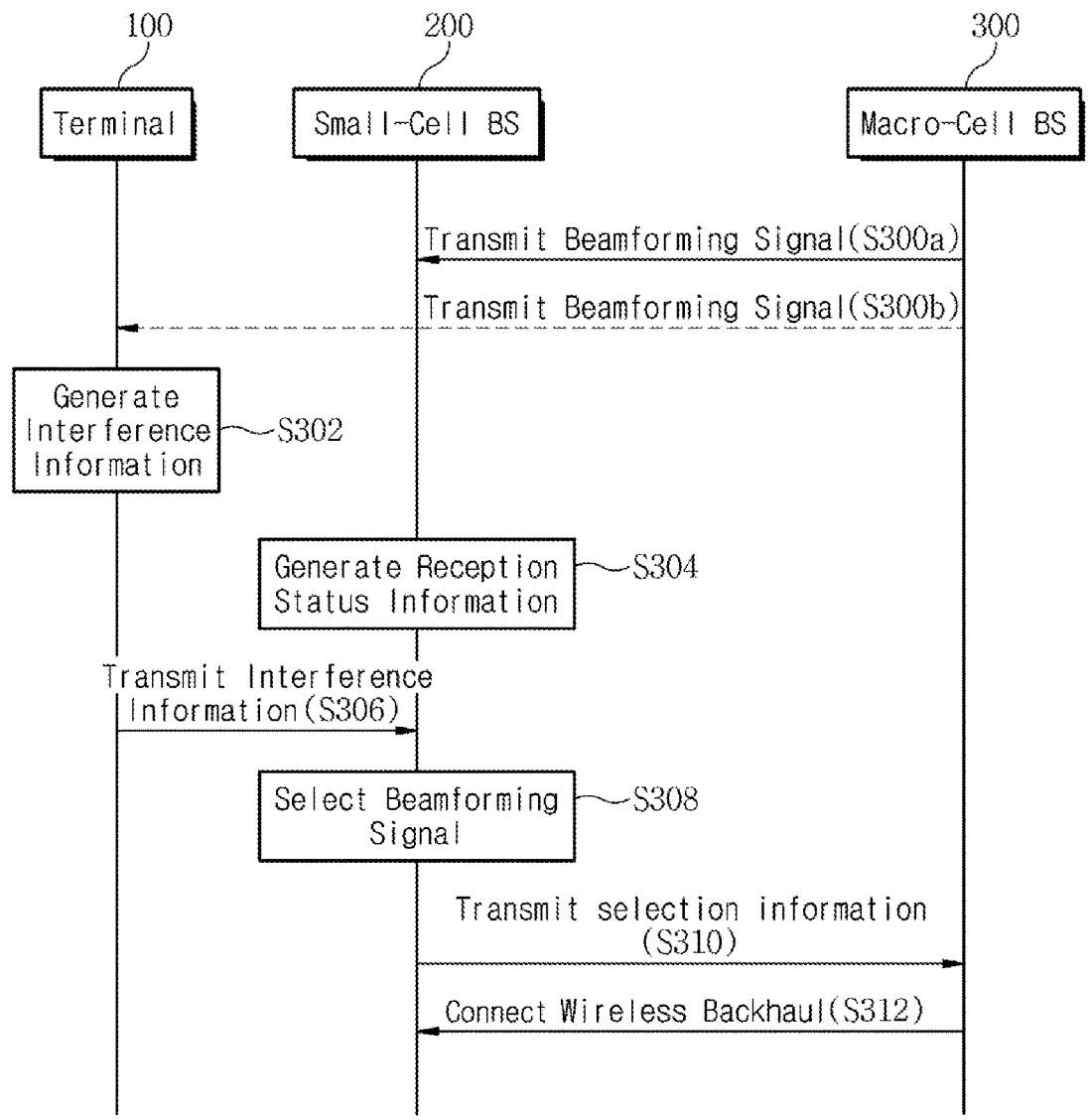

FIG. 3 is a message sequence diagram showing a process of connecting a wireless backhaul according to another embodiment of the disclosure.

Referring to FIG. 3, in the other embodiment of the disclosure, it is possible to see a process in which the macro-cell BS 300 transmits beamforming signals and the terminal 100 and the small-cell BS 200 generate information based on the beamforming signals transmitted by the macro-cell BS 300 such that a wireless backhaul is connected, like in FIG. 2.

Specifically, the macro-cell BS 300 transmits a plurality of beamforming signals one by one in different directions. At this time, the plurality of beamforming signals are radially transmitted and arrive at the small-cell BS 200 and the terminal 100 near the small-cell BS 200 (S300a and S300b).

The terminal 100 generates interference information based on the beamforming signals arriving from the macro-cell BS 300 (S302) and transmits the generated interference information to the small-cell BS 200 through a wireless link between the terminal 100 and the small-cell BS 200 (S306).

The small-cell BS 200 generates reception status information based on the beamforming signals arriving from the macro-cell BS 300 (S304). The small-cell BS 200 selects a beamforming signal to be received based on the interference information received from the terminal 100 and the reception status information generated by itself (S308). The small-cell BS 200 transmits selection information to the macro-cell BS 300 (S310).

The macro-cell BS 300 connects a wireless backhaul by beamforming toward the small-cell BS 200 based on the received selection information (S312).

According to the embodiments shown in FIGS. 2 and 3, in a non-line-of-sight (NLOS) environment in which an obstacle and the like is present, it is possible to check beam reception status and interference in which influence of the obstacle is taken into consideration and perform optimal beamforming.

Also, in a line-of-sight (LOS) environment, it is possible to connect a wireless backhaul which can minimize interference based on location information of the terminal 100.

Figure 4:
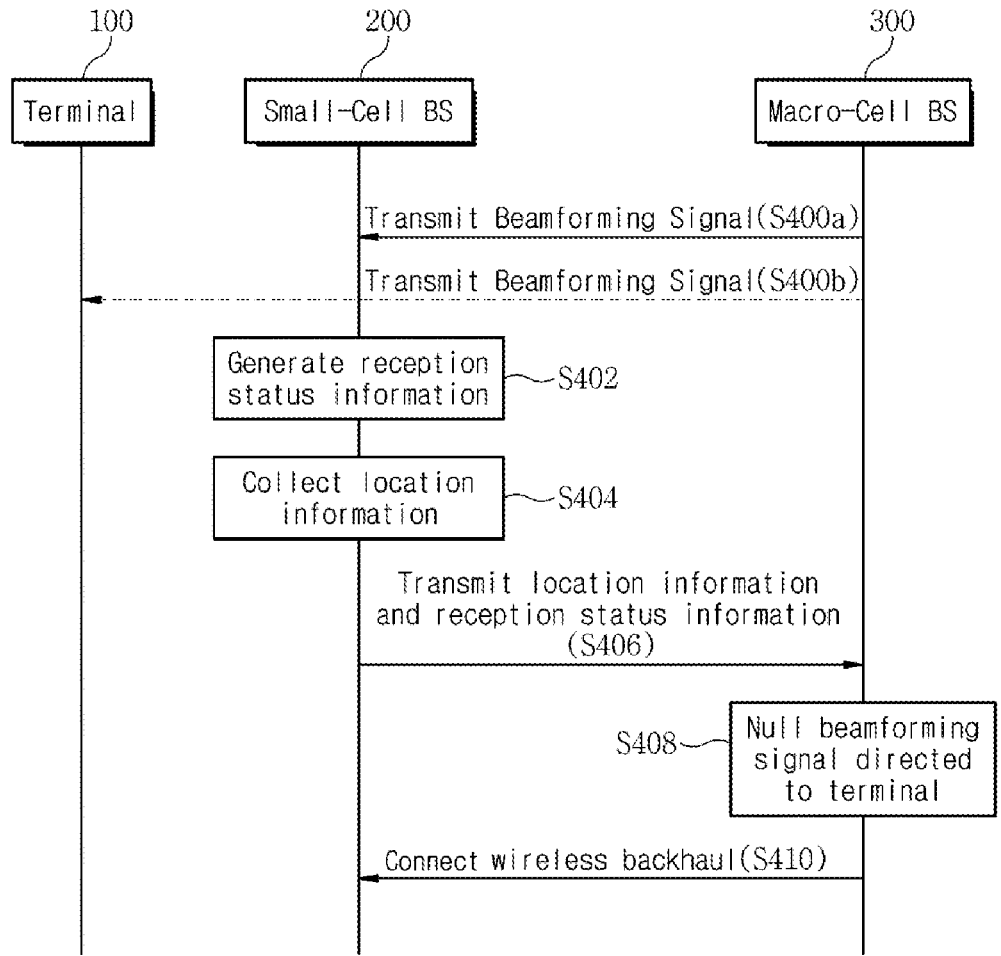

FIG. 4 is a message sequence diagram showing a process of connecting a wireless backhaul using location information according to still another embodiment of the disclosure.

Referring to FIG. 4, the macro-cell BS 300 radially transmits beamforming signals, and the signals arrive at the small-cell BS and the terminal within the beamforming signal range thereof (S400a and S400b).

The small-cell BS 200 generates reception status information based on the beamforming signals arriving from the macro-cell BS 300 (S402). When it is determined based on the reception status information that it is easy to collect location information of the terminal 100 (when the small-cell BS 200 and the macro-cell BS 300 are not in an NLOS environment), the small-cell BS 200 may collect location information of the terminal (S404). Here, the location information may be received from the terminal 100 or collected from anywhere such as upper and lower structures of a communication network in which the location information of the terminal 100 exists. The small-cell BS 200 transmits the collected location information of the terminal 100 and the reception status information generated by itself to the macro-cell BS 300 (S406).

The macro-cell BS 300 nulls a beamforming signal directed to the terminal 100 based on the received reception status information and location information of the terminal 100 (S408). The macro-cell BS 300 transmits beamforming signals other than the nulled beamforming signal and connects a wireless backhaul to the small-cell BS 200 using the transmitted beamforming signals (S410).

Next, a configuration and operation of a wireless backhaul connecting apparatus applied to the above-described small-cell BS 200 and macro-cell BS 300 will be described with reference to FIGS. 5 and 6.

FIG. 5 is a diagram showing a structure of a wireless backhaul connecting apparatus according to an embodiment of the disclosure. The wireless backhaul connecting apparatus is provided in the small-cell BS 200 and the macro-cell BS 300.

As shown in FIG. 5, the wireless backhaul connecting apparatus according to an embodiment of the disclosure may include a wireless transceiving unit 10 and a control unit 20.

Among the components shown in FIG. 5, the wireless transceiving unit 10 is a component for exchanging wireless signals between BSs. In an embodiment, the wireless transceiving unit 10 may transmit and receive a plurality of beamforming signals having different directivities. Also, the wireless transceiving unit 10 may receive interference information generated by the terminal 100 and transmit and receive reception status information and selection information of a beamforming signal. In another embodiment, the wireless transceiving unit 10 may transmit and receive location information of the terminal 100.

Next, the control unit 20 is a component for checking information received through the wireless transceiving unit 10, controlling the wireless transceiving unit 10, and connecting a wireless backhaul by generating information and selecting a beamforming signal.

The control unit 20 may include a beamforming search module 22, a collection module 24, and a backhaul connecting module 26.

The beamforming search module 22 is a component for controlling the wireless transceiving unit 10 so that a plurality of beamforming signals having different directivities are transmitted from the macro-cell BS 300 and received by the small-cell BS 200, and for checking information on reception status of the plurality of beamforming signals at the small-cell BS 200. The plurality of beamforming signals may include training symbols.

The collection module 24 is a component for collecting information on the plurality of beamforming signals' interference with the terminal 100 connected to the small-cell BS 200 or location information of the terminal 100. The collection module 24 may use the wireless transceiving unit 10 for information collection and provide collected information to the backhaul connecting module 26.

The backhaul connecting module 26 is a component for selecting one of the plurality of beamforming signals based on the reception status information of the plurality of beamforming signals and the interference information or the location information and for connecting a wireless backhaul between the macro-cell BS 300 and the small-cell BS 200. The backhaul connecting module 26 may null a beamforming signal of a specific direction or transmit a beamforming signal in a selected direction.

Figure 6:
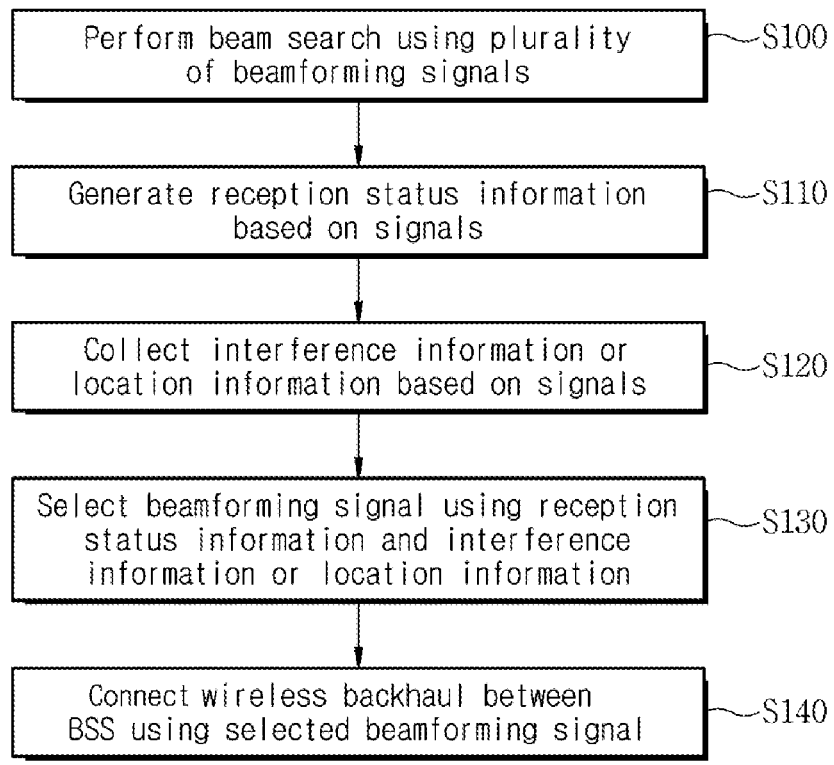
FIG. 6 is a flowchart illustrating a method of connecting a wireless backhaul according to the disclosure.

FIG. 6 is a flowchart illustrating a wireless backhaul connecting process performed by the above-described wireless backhaul connecting apparatus.

Referring to FIG. 6, a wireless backhaul connecting apparatus performs a beam search using a plurality of beamforming signals (S100). During this process, the wireless backhaul connecting apparatus in the macro-cell BS 300 transmits a plurality of beamforming signals one by one in different directions. At this time, the plurality of beamforming signals are radially transmitted. The wireless backhaul connecting apparatus in the small-cell BS 200 receives the beamforming signals that have been radially transmitted. The beamforming signals may include training symbols.

The wireless backhaul connecting apparatus in the small-cell BS 200 generates reception status information based on the beamforming signal (S110).

Also, the wireless backhaul connecting apparatus in the small-cell BS 200 collects interference information or location information based on the signal (S120). The wireless backhaul connecting apparatus in the small-cell BS 200 transmits the collected information to the wireless backhaul connecting apparatus in the macro-cell BS 300.

A wireless backhaul connecting apparatus selects a beamforming signal using the reception status information and the interference information or the location information (S130). The selection may be made by any of the wireless backhaul connecting apparatus in the small-cell BS 200 and the wireless backhaul connecting apparatus in the macro-cell BS 300.

The wireless backhaul connecting apparatus connects a wireless backhaul between the BSs using the selected beamforming signal (S140). This process may be performed by transmitting the at least one beamforming signal selected by the wireless backhaul connecting apparatus or by nulling at least one beamforming signal that interferes with the terminal 100.

Figure 7:
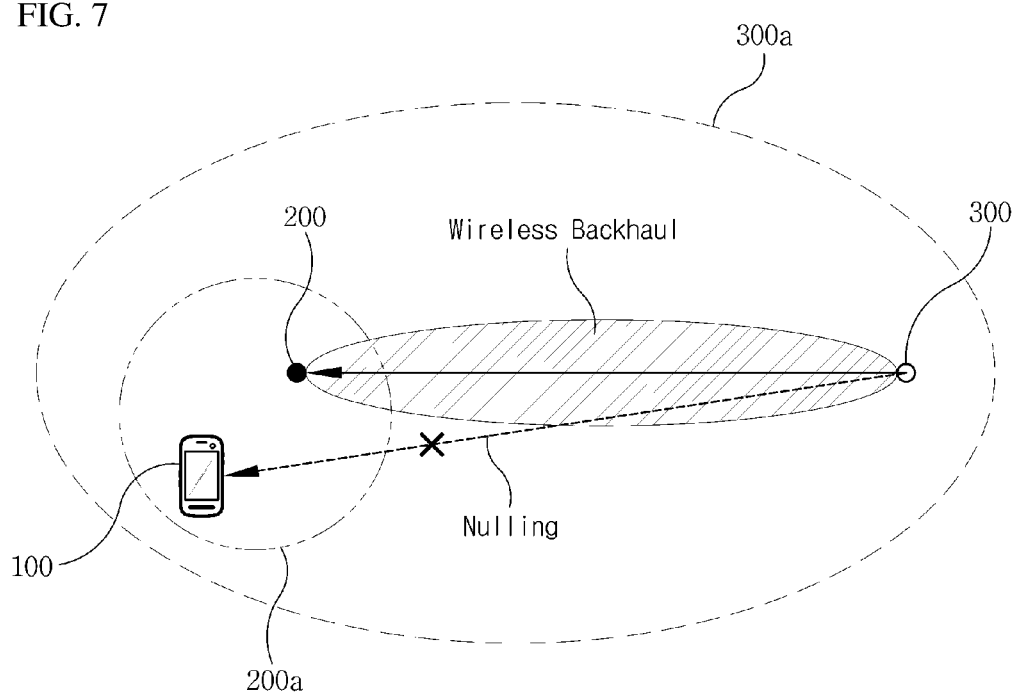
FIG. 7 is a schematic diagram showing a beamforming control status according to an embodiment of the disclosure.

FIG. 7 is a schematic diagram showing a beamforming control status according to an embodiment of the disclosure. When there is no obstacle between the small-cell BS 200 and the macro-cell BS 300, operation may be performed as shown in the message sequence diagram of FIG. 4, and the macro-cell BS 300 nulls a beamforming signal directed to the terminal 100.

In other words, the macro-cell BS 300 reduces an antenna gain of the beamforming signal directed to the terminal 100, thereby preventing the beamforming signal from being transferred to the terminal 100.

Figure 8:
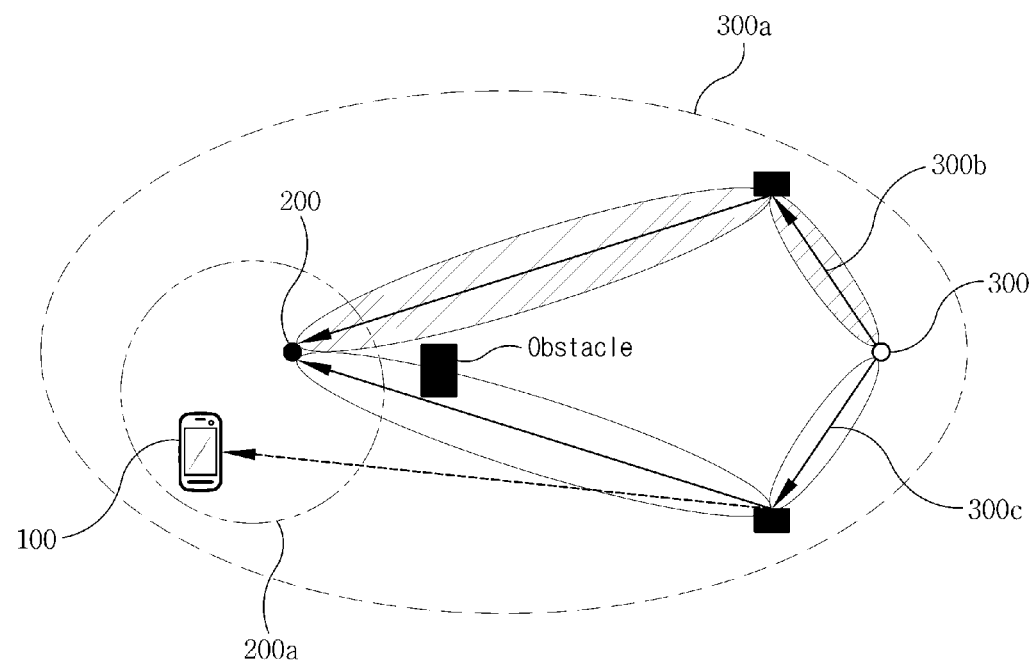
FIG. 8 is a schematic diagram showing a beamforming control status according to another embodiment of the disclosure.

FIG. 8 is a schematic diagram showing a beamforming control status according to an embodiment of the disclosure.

When there is an obstacle between the small-cell BS 200 and the macro-cell BS 300, operation may be performed as shown in the message sequence diagram of FIG. 2 or 3.

Here, some of a plurality of beamforming signals emitted from the macro-cell BS 300 may not be transferred to the small-cell BS 200 due to an obstacle.

In the above environment, it is assumed as a result of a search that each of a first beamforming signal 300b and a second beamforming signal 300c is reflected by an obstacle and then transferred to the small-cell BS 200 along a changed path and reception status of the case is the best.

At this time, the terminal 100 connected to the small-cell BS 200 is more affected by the second beamforming signal 300c than the first beamforming signal 300b that is transmitted along a farther path. In other words, interference information of the second beamforming signal 300c measured by the terminal 100 is greater than interference information of the first beamforming signal 300b.

In this case, the first beamforming signal 300b may be selected to connect a wireless backhaul between the small-cell BS 200 and the macro-cell BS 300.

Although the specification and drawings illustrate exemplary configurations of devices, embodiments of the subject matter and the functional operations described in this specification can be provided in another type of digital electronic circuitry, or in computer software, firmware, or hardware, including the structures disclosed in this specification and their structural equivalents, or in combinations of one or more thereof. Embodiments of the subject matter described in this specification can be implemented as one or more computer program products, that is, one or more modules of computer program instructions encoded on a tangible program storage medium for execution by, or to control the operation of, the devices according to the disclosure. A computer-readable medium can be a machine-readable storage device, a machine-readable storage substrate, a memory device, a composition of matter having influence on a machine-readable propagated signal, or a combination of one or more thereof.

While this specification contains details of many specific embodiments, these should not be construed as limitations on the scope of any invention or what can be claimed, but rather as descriptions of features specific to particular embodiments of a particular invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Further, although features may be described as acting in certain combinations and even initially claimed as such, one or more features from a claimed combination can be excised from the combination in some cases, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In particular cases, multitasking and parallel processing may be advantageous. Also, the separation of various system components in the embodiments described above should not be understood as requiring such separation in all embodiments, and it should be understood that the described program components and systems can generally be integrated together in a single software product or packaged into multiple software products.

What is claimed is:

1. A method of connecting a wireless backhaul, the method comprising:
   receiving, by a small-cell base station (BS), a plurality of beamforming signals from a macro-cell BS to form a wireless backhaul between the macro-cell BS and the small-cell base BS, wherein the plurality of the beamforming signals have different directivities respectively;
   generating, by a small-cell base station BS, reception status information on each of the plurality of beamforming signals;
   collecting, by the small-cell BS, from a terminal connected to the small-cell BS, interference information on each of the plurality of beamforming signals or location information of the terminal; and
   performing, by the small-cell BS, one of:
      (i) selecting, by the small-cell BS, a beamforming signal used for forming the wireless backhaul from among the plurality of the beamforming signals based on the generated reception status information and the collected interference information or the location information; or
      (ii) transmitting, by the small-cell BS, the generated reception status information and the collected interference information or location information to the macro-cell BS such that the macro-cell BS selects the beamforming signal used for forming the wireless backhaul from among the plurality of the beamforming signals, based on the generated reception status information and the collected interference information or information.

2. The method of claim 1, further comprising:
   when the small-cell BS selects the beamforming signal used for forming the wireless backhaul,
   transmitting, by the small-cell BS, a selection result to the macro-cell BS.

3. The method of claim 1, wherein the plurality of beamforming signals include preset training symbols.

4. The method of claim 3, wherein the collecting of the interference information or the location information comprises receiving interference information of the beamforming signals including the training symbols from the terminal.

5. The method of claim 1, wherein the plurality of the beamforming signals have different directivities respectively.

6. A method of connecting a wireless backhaul, the method comprising:
   transmitting, by a macro-cell base station (BS), a plurality of beamforming signals to a small-cell BS to form a wireless backhaul between the macro-cell BS and the small-cell BS, wherein the plurality of the beamforming signals have different directivities respectively;
   receiving, by the macro-cell BS, reception status information of the plurality of the beamforming signals and information on the plurality of the beamforming signals' interference with a terminal connected to the small-cell BS or location information of the terminal from the small-cell BS; and
   selecting, by a macro-cell base station (BS), a beamforming signal used for forming the wireless backhaul from among the plurality of the beamforming signals based on the reception status information and the interference information or the location information, such that the wireless backhaul is connected to the small-cell BS by using the selected beamforming signal.

7. The method of claim 6, wherein the connecting of the wireless backhaul comprises
   nulling another beamforming signal, which incurs interference toward the terminal, based on the location information of the terminal.

8. The method of claim 6, wherein the plurality of the beamforming signals have different directivities respectively.

9. An apparatus for connecting a wireless backhaul, the apparatus comprising:
   a wireless transceiving unit configured to transmit and receive wireless signals; and
   a control unit configured to control the wireless transceiving unit,
   wherein the control unit comprises:
   a beamforming search module configured to
      control the wireless transceiving unit to exchange a plurality of beamforming signals having different directivities between a macro-cell base station (BS) and a small-cell BS, and
      check information on reception status of the plurality of the beamforming signals at the small-cell BS;
   a collection module configured to collect information on the plurality of the beamforming signals' interference with a terminal connected to the small-cell BS or location information of the terminal; and
   a backhaul connecting module configured to
      select a beamforming signal used for forming the wireless backhaul from among the plurality of beamforming signals based on the reception status information of the plurality of the beamforming signals and the interference information or the location information, and
      connect the wireless backhaul to the macro-cell BS using the selected beamforming signal.

* * * * *